(12) United States Patent
White

(10) Patent No.: US 9,350,697 B2
(45) Date of Patent: May 24, 2016

(54) PROVIDING NETWORK ADDRESSES FOR NETWORK NODES

(71) Applicant: Adtran Inc., Huntsville, AL (US)

(72) Inventor: Troy W. White, Toney, AL (US)

(73) Assignee: Adtran Inc., Huntsville, AL (US)

( * ) Notice: Subject to any disclaimer, the term of this patent is extended or adjusted under 35 U.S.C. 154(b) by 154 days.

(21) Appl. No.: 14/313,289

(22) Filed: Jun. 24, 2014

(65) Prior Publication Data

US 2015/0372967 A1    Dec. 24, 2015

(51) Int. Cl.
*H04L 29/12* (2006.01)
*G06K 7/10* (2006.01)
*G06K 7/00* (2006.01)

(52) U.S. Cl.
CPC .............. *H04L 61/20* (2013.01); *G06K 7/0008* (2013.01); *G06K 7/10158* (2013.01); *G06K 7/10297* (2013.01)

(58) Field of Classification Search
None
See application file for complete search history.

(56) References Cited

U.S. PATENT DOCUMENTS

2004/0178270 A1* 9/2004 Pradhan et al. .......... 235/462.13
2009/0108995 A1* 4/2009 Tucker et al. ................ 340/10.1

\* cited by examiner

*Primary Examiner* — Daniell L Negron
(74) *Attorney, Agent, or Firm* — Fish & Richardson P.C.

(57) ABSTRACT

Methods, systems, and apparatus for providing network addresses are disclosed. In one aspect, a network element device in a telecommunication network includes a chassis coupled with a passive Radio Frequency Identification (RFID) device and a network line module coupled to the chassis. The passive RFID device stores a network node identifier that is used to communicate with a second network element device communicatively coupled with the network element device. The network line module includes a RFID reader that is configured to obtain the network node identifier from the passive RFID device when the network line module is initialized.

14 Claims, 4 Drawing Sheets

PROVIDING NETWORK ADDRESSES FOR NETWORK NODES

BACKGROUND

This specification relates to providing network addresses for network nodes.

Chassis based systems are often used in the implementation of a telecommunication network. In a chassis based system, a network element device includes a chassis that has one or more slots. Each slot may house a network line module (e.g., a module that facilitates communications over the network). A network line module performs the function of a network node in the telecommunication network. A chassis based system provides flexibility in operations and maintenance of a telecommunication network. For example, when a network operator desires to upgrade or repair a network node, the network operator may simply replace a network line module that is housed in the chassis of the network element device. The network operator may therefore keep the network element device in the field and avoid re-wiring the connections between the network element device and other network element devices in the telecommunication network.

SUMMARY

In general, one innovative aspect of the subject matter described in this specification can be embodied in a network element device in a telecommunication network. The network element device may include a chassis that includes one or more slots that receive one or more network line modules, a passive Radio Frequency Identification (RFID) device that stores a network node identifier and is coupled to the chassis, and a network line module installed in one of the slots of the chassis. The network node identifier is used to communicate with a second network element device communicatively coupled with the network element device. The network line module includes a RFID reader that is configured to obtain the network node identifier from the passive RFID device when the network line module is initialized. Other embodiments of this aspect include corresponding devices and methods.

These and other embodiments can each optionally include one or more of the following features. The network node identifier can be a Medium Access Control address. The passive RFID device can be configured to store system inventory information including at least one of a chassis serial number, a manufacture date, or a Common Language Equipment Identification (CLEI) code. The network line module can be initialized after the network line module is powered up.

The network element device can include a redundant network line module configured to be activated when the network line module is offline. The redundant network line module can include a second RFID reader that is configured to obtain the network node identifier from the passive RFID device when the redundant network line module is initialized.

The passive RFID device can be configured to store a second network node identifier and metadata. The network line module can be configured to select one of the network node identifier or the second network node identifier based on the metadata. The metadata can include a slot location in the chassis that corresponds to the network node identifier. The network line module can be configured to select the network node identifier in response to the network line module being installed in the slot location.

Another innovative aspect of the subject matter described in this specification can be embodied in methods that include the actions of executing an initialization process for a network line module in a network element device, wherein the network line module comprises a RFID reader; and obtaining, by the RFID reader and from a passive RFID device that is coupled with a chassis housing the network line module, a network node identifier that is used by the network line module to communicate with a second network element device communicatively coupled with the network element device.

These and other embodiments can each optionally include one or more of the following features. The network node identifier can be a Medium Access Control address. The passive RFID device can be configured to store system inventory information including at least one of a chassis serial number, a manufacture date, or a Common Language Equipment Identification (CLEI) code. The initialization process can be executed after the network line module is powered up.

Methods can include the actions of activating a redundant network line module when the network line module fails, wherein the redundant network line module comprises a second RFID reader; and obtaining, by the second RFID reader and from the passive RFID device, the network node identifier when the redundant network line module is initialized.

The passive RFID device can be configured to store a second network node identifier and metadata. Methods can include the action of selecting, by the network line module, one of the network node identifier or the second network node identifier based on the metadata. The metadata can include a slot location in the chassis that corresponds to the network node identifier. The action of selecting can include selecting the network node identifier in response to the network line module being installed in the slot location.

Particular embodiments of the subject matter described in this specification can be implemented so as to realize one or more of the following advantages. By storing the network node identifier in a passive RFID device that is coupled with the chassis of the network element device, the same network node identifier can be re-used when different network line modules are activated to perform the function of a network node, even when the different network line modules have different hard-coded identifiers. This approach therefore reduces the interruption time and avoids network problems that may be caused by a changed network identifier during the replacement operation of network line modules. In addition, employing a passive RFID device to store the network node identifier reduces probability of equipment failures and simplifies maintenance operations in the field because the passive RFID device can be implemented without active components.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
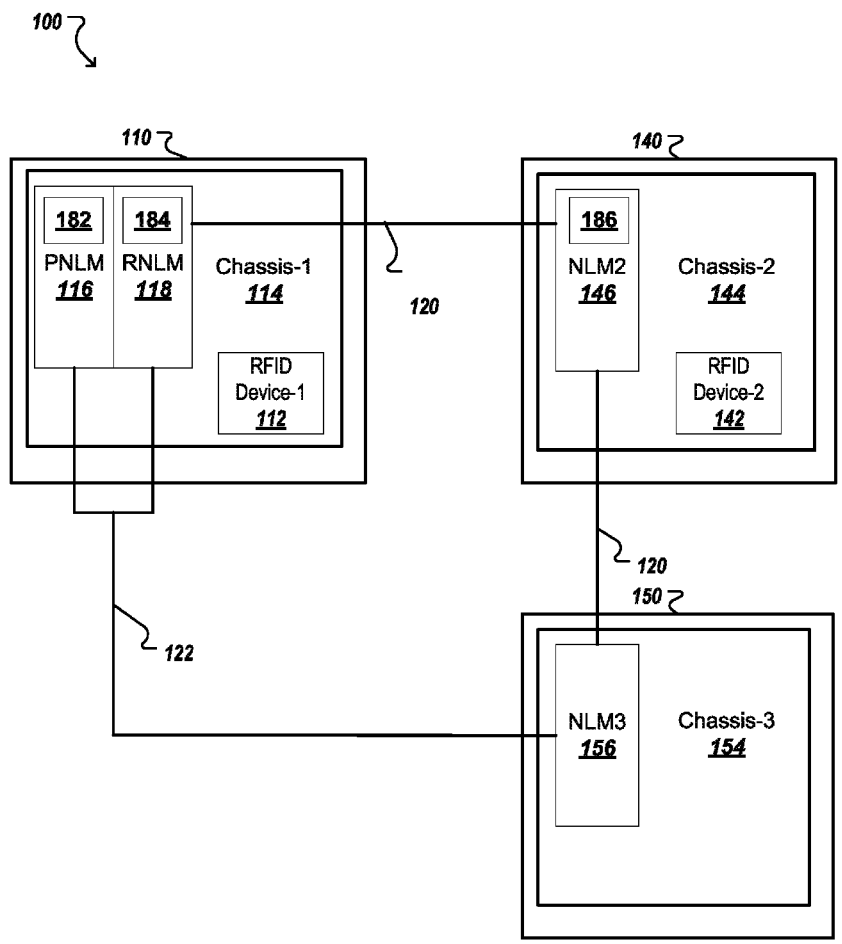
FIG. 1 is a block diagram of an example telecommunication network.

In a telecommunication network, a network address is used to identify a network node that transmits or receives a telecommunication transmission. In a chassis based system, a network line module performing the function of a network node may use a network node identifier as its network address to communicate with other network nodes. In such a case, each network line module may be assigned a network node identifier. When a particular network line module is replaced by a new network line module in the field, the network operation may be interrupted if the new network line module is assigned a different network node identifier than the particular network line module. In such a case, network problems may arise because the other network nodes in the telecommunication network do not have the new network node identifier of the new network line module. Therefore the other network nodes may not be able to communicate with the new network line module until they receive the new network node identifier and determine the new network address of the new network line module accordingly.

As discussed in more detail below, the new network line modules can obtain the same network node identifier that is used by the particular network line module, and therefore keep the same network address during a replacement operation. For example, as discussed in detail with respect to FIGS. 1-3, a network element device in a telecommunication network may include a chassis that is coupled with a passive RFID device. The passive RFID device may store a network node identifier. A network line module that is housed in the chassis may include a RFID reader. When the network line module is initialized, the RFID reader may obtain the network node identifier from the passive RFID device. The network line module may use the obtained network node identifier as its network address to communicate with other network element devices connected to the telecommunication network.

The techniques described herein may provide one or more advantages. For example, because the network node identifier is stored in the passive RFID device coupled with the chassis, different network line modules may use the same network node identifier. For example, when a network operator replaces a particular network line module with a new network line module, the RFID reader in the new network line module may obtain the network node identifier from the passive RFID device. The new network line module may therefore use the same network node identifier and keep the same network address as the particular network line module that is being replaced.

Similarly, for a network element device that is equipped with redundancy (e.g., two or more network line modules), a RFID reader on a redundant network line module may obtain the same network node identifier as the primary network line module. When the primary network line module fails (or is otherwise taken offline), the redundant network line module may be activated and use the same network node identifier as its network address. This approach reduces interruption time that may result from replacing a network line module and avoids network problems that may occur if the network node identifier changes. Furthermore, storing the network node identifier in a passive RFID device reduces the cost of field maintenance. For example, a passive RFID device is generally cheaper and generally has a lower failure rate than an active memory device. Additionally, a passive RFID device can provide convenient access to the network node identifier because it can be attached to a wide range of locations on the chassis.

FIG. 1 is a block diagram of an example telecommunication network 100. The example telecommunication network 100 includes a network element device (NED-1) 110 that is communicatively coupled with a network element device (NED-3) 150 using a Y-Cable 122, and a network element device (NED-2) 140 that is communicatively coupled with both the NED-1 110 and the NED-3 150 using Cables 120 (or another communications link).

The NED-1 110 includes a chassis-1 114 that houses a primary network line module (PNLM) 116 and a redundant network line module (RNLM) 118, and a RFID device-1 112 that is coupled with the chassis-1 114. The chassis-1 114 is a frame that houses one or more components of the NED-1 110. In some implementations, the chassis-1 114 may include one or more power suppliers that provide power to the components of the NED-1 110, internal circuitry that connect the components of the NED-1 110, and external circuitry that provides an interface for the NED-1 110 to connect with other network element devices in the example telecommunication network 100. The chassis-1 114 may have one or more slots, and each slot may receive or house one network line module. In the illustrated example, the chassis-1 114 has two slots. The first slot houses the PNLM 116 and the second slot houses the RNLM 118.

The RFID device-1 112 is a RFID device that stores one or more network node identifiers for the network line modules in the NED-1 110. The network node identifier may be used as a network address for a network node. In some implementations, the network node identifier may be a layer-2 address (e.g., data link layer address). For example, the network node identifier may be a Media Access Control (MAC) address. A MAC address is a unique station identifier assigned to a communication device by the manufacturer of the device. MAC addresses may be used as network addresses in telecommunication network protocols. For example, a MAC address may be used as a network address in an Ethernet protocol based Local Area Network (LAN). Alternatively, the network node identifier may be a layer-3 address (e.g., network layer address) that identifies a network node in a telecommunication network. For example, the network node identifier may be an Internet Protocol (IP) address.

Figure 2:
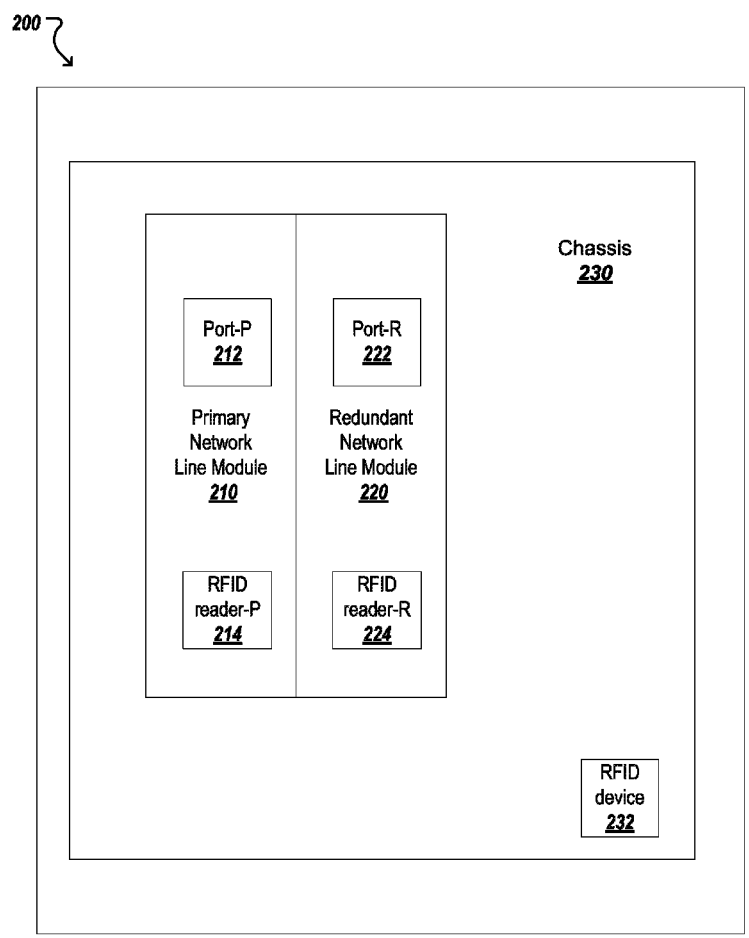
FIG. 2 is a block diagram of an example network element device that includes a primary network line module and a redundant network line module.
Figure 3:
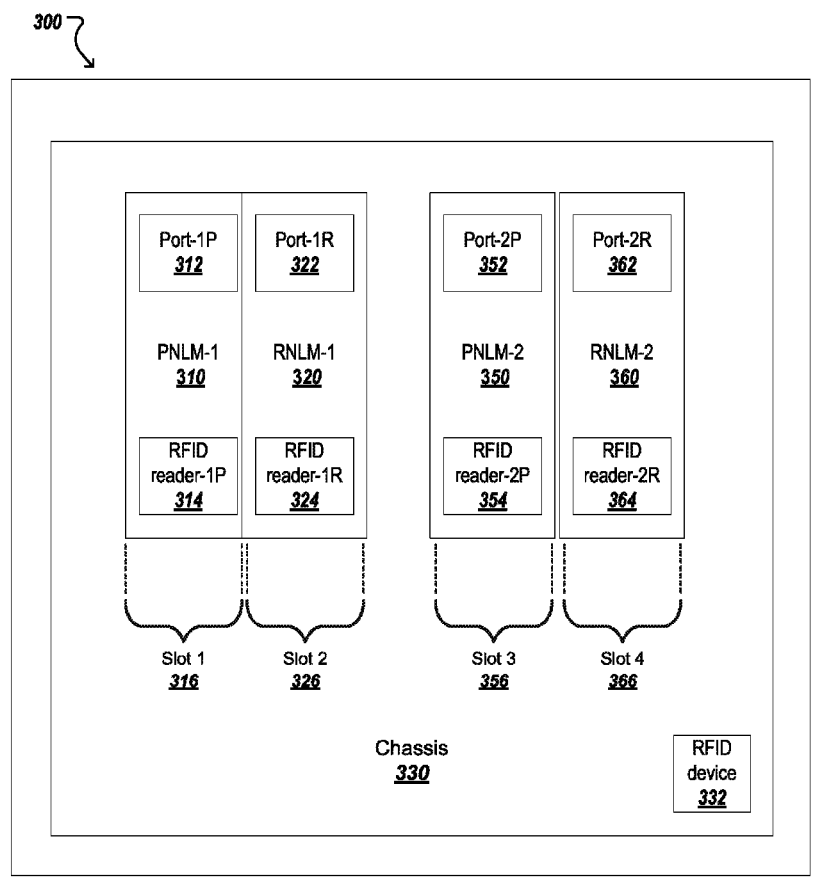
FIG. 3 is a block diagram of an example network element device that includes two primary network line modules and two redundant network line modules.

In some implementations, the RFID device-1 112 may also store system inventory information. The system inventory information may include a chassis serial number, a manufacture date, or a Common Language Equipment Identification (CLEI) code. The system inventory information may be obtained by RFID readers in the PNLM-1 116 and/or the RNLM-1 118. Alternatively or additionally, the system inventory information may be obtained by field maintenance personnel using hand-held RFID readers. FIGS. 2-3 and associated descriptions provide additional details of the implementations of the RFID device-1 112.

The PNLM 116 can include any hardware, software, firmware, or combination thereof configured to perform the function of a network node in the example telecommunication network 100. The example telecommunication network 100 may be one of a copper wire network, an optical network, a wireless network, or a combination thereof. For example, the example telecommunication network 100 may be a Local Area Network (LAN). In such a case, the PNLM 116 may perform the function of a network node in a LAN. For example, the PNLM 116 may be a network interface controller (NIC) card that is configured to communicate with other network element devices on the LAN using LAN protocols.

The LAN protocols may be Ethernet, token ring, or Wi-Fi protocols. Alternatively or additionally, the example telecommunication network 100 may be a Wide Area Network (WAN), a Personal Area network (PAN), a Campus Area Networks (CAN), or a Metropolitan Area Network (MAN). For example, the example telecommunication network 100 may be a wireless WAN such as a $3^{rd}$ Generation Universal Mobile Telecommunications System (3G UMTS) network or a $4^{th}$ Generation Long Term Evolution (4G LTE) network. In such a case, the PNLM 116 may be a network line module that performs the function of a network node on a wireless WAN. For example, the PNLM 116 may be configured to communicate with other network element devices on the wireless WAN using 3G UMTS protocols or 4G LTE protocols.

The PNLM 116 includes a RFID reader-1 182 that is configured to obtain information stored on the RFID device-1 112. The RFID reader-1 182 may be configured to obtain the information stored on the RFID device-1 112 when the PNLM 116 is initialized. In some implementations, the PNLM 116 is initialized when the PNLM 116 is powered up after it is installed in the chassis-1 114. After powered up, the RFID reader-1 182 may obtain the stored information and the PNLM 116 may store the obtained information in a memory. In such a case, the RFID reader-1 182 may not need to obtain the stored information again until the PNLM 116 is removed from the chassis-1 114. Alternatively or additionally, the PNLM 116 may be initialized when the PNLM 116 is powered up, reset, or rebooted. In such a case, the RFID reader-1 182 may obtain the stored information from the RFID device-1 112 more than one time while the PNLM 116 is installed in the chassis-1 114. FIGS. 2-3 and associated descriptions provide additional details of the implementations of the RFID reader-1 182.

The RNLM 118 is a redundant module for the PNLM 116. The RNLM 118 can include any hardware, software, firmware, or combination thereof configured to perform the same network node function as the PNLM 116. Furthermore, the RNLM 118 is configured to be activated when the PNLM 116 fails or is otherwise taken offline. For example, in an online hot-swap operation, a failure of the PNLM 116 may trigger the activation of the RNLM 118.

The RNLM 118 may also include a RFID reader-2 184. The RFID reader-2 184 may obtain the stored information from the RFID device-1 112 when the RNLM 118 is initialized. The RNLM 118 may be initialized when the RNLM 118 is powered up after it is installed in the chassis-1 114. Alternatively or additionally, the RNLM 118 may be initialized when the RNLM 118 is activated, reset, or rebooted.

The NED-2 140 is a network element device that includes a chassis-2 144 that houses a NLM-2 146, and a RFID device-1 142 that is coupled with the chassis-2 144. The chassis-2 144 is a frame that houses one or more components of the NED-2 140. In the illustrated example, the chassis-2 144 has one slot that houses the NLM-2 146. The RFID device-2 144 is a RFID device that stores one or more network node identifiers for the network line modules in the NED-2 140. In some implementations, the one or more network node identifiers may be MAC addresses. The NLM-2 146 can include any hardware, software, firmware, or combination thereof configured to perform the function of a network node.

The NLM-2 146 may include a RFID reader-3 186 that is configured to obtain information stored on the RFID device-2 142. The RFID reader-3 186 may be configured to obtain the network node identifiers when the NLM-2 146 is initialized. The NLM-2 146 may be initialized when the NLM-2 146 is powered up, reset, or rebooted. A network node identifier that is stored in the RFID device-2 142 may be used by different network line modules. For example, in an offline exchange operation, a network operator may take out the NLM-2 146 and install a new network line module in the chassis-2 144. The new network line module may also include a new RFID reader. When the new network line module is initialized, the new RFID reader of the new network line module may obtain the same network node identifier that the NLM-2 146 has used.

The NED-3 150 is a network element device that includes a chassis-3 154 that houses a NLM-3 156. The chassis-3 154 is a frame that houses one or more components of the NED-3 150. In the illustrated example, the chassis-3 154 has one slot that houses the NLM-3 156. The NLM-3 156 can include any hardware, software, firmware, or combination thereof configured to perform the function of a network node.

During a network operation, the NLM-3 156 may communicate with the NLM-2 146 and/or the PNLM 116. When the NLM-3 156 communicates with the PNLM 116, the network node identifier of the PNLM 116 may be used as the network address for the PNLM 116.

In an online hot swap operation, the PNLM 116 fails and the RNLM 118 is activated. Because the RNLM 118 can obtain the same network node identifier that the PNLM 116 has used, the NLM-3 156 can continue to use the same network node identifier as the network address for the RNLM 118 to communicate with the RNLM 118. Similarly, when the NLM-3 156 communicates with the NLM-2 146, the network node identifier of the NLM-2 146 is used as the network address for the NLM-2 146. In an offline exchange operation, the NLM-2 146 is replaced by a new network line module. Because the new network line module can obtain the same network node identifier that the NLM-2 146 has used, the NLM-3 156 can continue to use the same network node identifier as the network address for the new network line module to communicate with the new network line module.

The Cables 120 and the Y-Cable 122 are referred to for purposes of example, but other communication links that provide connections between network element devices in the example telecommunication network 100 can be used. In some implementations, various copper wire cables, optical cables, or wireless interfaces that provide wireless connections can be used to provide the communications links between the network element devices. For example, the example telecommunication network 100 may be a Gigabit G.8032 Ethernet Ring Protection Switching (ERPS) ring. In such a case, Cables 120 and the Y-Cable 122 may be Gigabit Ethernet cables that connect the PNLM 116, the RNLM 118, the NLM-2 146, and the NLM-3 156 to form a Gigabit ERPS ring.

In the illustrated example, the Cables 120 provide connections between the NLM-2 146 and the NLM-3 156. The Cables 120 also provide connections between the NLM-2 146 and the RNLM 118. In the illustrated example, the Y-Cable 122 provides connections among the NLM-3 156, the PNLM 116 and the RNLM 118. In the illustrated example, the Y-Cable 122 has two communications ends. One communication end has one connection interface that connects the NLM-3 156. The other communication end has two connection interfaces. One connection interface connects the PNLM 116 and the other connection interface connects the RNLM 118. In a network operation, the PNLM 116 is activated and communicates with the NLM-3 156 through the Y-Cable 122. In an online hot-swap operation, the PNLM 116 fails and the RNLM 118 is activated and obtains the network node identifier that was being used by the PNLM 116 from the RFID device-1 112. The RNLM 118 can use the obtained network node identifier to communicate with the NLM-3 through the Y-Cable 122 after the RNLM 118 is activated.

FIG. 2 is a block diagram of an example network element device 200 that includes a primary network line module and a redundant network line module. As illustrated, the example network element device 200 includes a chassis 230 that houses a PNLM 210 and a RNLM 220, and a RFID device 232 that is coupled with the chassis 230. The chassis 230 is a frame that houses one or more components of the example network element device 200. In the illustrated example, the chassis 230 has two slots. The first slot houses the PNLM 210 and the second slot houses the RNLM 220.

The RFID device 232 is a RFID device that stores one or more network node identifiers for the network line modules in example network element device 200. In some implementations, the one or more network node identifiers may be MAC addresses. As described previously, the RFID device 232 may also store system inventory information.

In some implementations, the RFID device 232 is a passive RFID device. In such a case, the RFID device 232 may respond to interrogation signals from RFID readers by transmitting the stored network node identifiers. In some implementations, the RFID device 232 may be an active RFID device. In such a case, the RFID device 232 may have an on-board battery and may periodically transmit the stored network node identifiers. In some implementations, the RFID device 232 may be a battery-assisted passive (BAP) RFID device. In such a case, the RFID device 232 may have a small battery on board and may be activated when in the presence of an RFID reader.

The RFID device 232 may be attached to a wide range of locations on the chassis 230. For example, the RFID device 232 may be attached to the front or side panel of the chassis 230 that are easy to be accessed by field maintenance personnel.

The PNLM 210 can include any hardware, software, firmware, or combination thereof configured to perform the function of a network node. The PNLM 210 includes a RFID reader-P 214 and a Port-P 212. The Port-P 212 is a communication port that provides an interface for the PNLM 210 to communicate with other network line modules and/or other network element devices. The Port-P 212 may be an interface that provides copper wire, optical, or wireless connections. For example, the example telecommunication network 100 may be a Gigabit G.8032 ERPS ring. In such a case, the Port-P 212 may be a Gigabit Ethernet Port that provides a connection interface to a Gigabit Ethernet Port on the RNLM 220, the NLM-2 146, the NLM-156, and/or any other network nodes in the Gigabit G.8032 ERPS ring. The Port-P 212 may connect with ports on other network nodes through the Cables 120 or the Y-Cable 122. The Port-P 212 may also connect with ports on other network line modules in the chassis 230 through internal circuitry of the chassis 230. In some implementations, the PNLM 210 may include more than one communication ports. The more than one communication ports may provide interfaces for the PNLM 210 to communicate with more than one network line modules and network element devices.

The RFID reader-P 214 is a RFID reader that is configured to obtain the information stored in the RFID device 232. As described previously, the stored information may include a network node identifier. The stored information may also include system inventory information.

In some cases, the capability of the RFID reader-P 214 may depend on the capability of the RFID device 232. For example, if the RFID device 232 is a passive RFID device or a BAP RFID device, the RFID reader-P 214 may be an active RFID reader. In such a case, the RFID reader-P 214 may transmit an encoded radio signal to interrogate the RFID device 232. The RFID device 232 may respond with a signal that indicates the information stored in the RFID device 232. The RFID reader-P 214 may receive the response signal and pass the stored information to the PNLM 210. The PNLM 210 may parse the stored information and retrieve the network node identifier. The PNLM 210 may use the network node identifier as its network address. If the RFID device 232 is an active RFID device, the RFID reader-P 214 may be a passive RFID reader. In such a case, the RFID reader-P 214 receives signals that are actively transmitted by the RFID device 232 and passes the stored information to the PNLM 210.

In some implementations, the RFID reader-P 214 may be configured to obtain the stored information on the RFID device 232 when the PNLM 210 is initialized. As described previously, the PNLM 210 may be initialized when the PNLM 210 is powered up after installation. The PNLM 210 may also be initialized when the PNLM is reset or rebooted.

The RNLM 220 is a redundant module for the PNLM 210. The RNLM 220 can include any hardware, software, firmware, or combination thereof configured to perform the same (or similar) network node functions as the PNLM 210. The RNLM 220 includes a RFID reader-R 224 and a Port-R 222. The Port-R 222 is a communication port that provides an interface for the RNLM 220 to communicate with other network line modules and/or other network element devices.

The RFID reader-R 224 is a RFID reader that is configured to obtain the information stored in the RFID device 232. The stored information may include a network node identifier. The RFID reader-R 224 may obtain the network node identifier when the RNLM 220 is initialized. The RNLM 220 may be initialized when the RNLM 220 is installed in the chassis 230. The RNLM 220 may also be initialized when the RNLM 220 is activated after the PNLM 210 fails, is reset, or is rebooted.

FIG. 3 is a block diagram of an example network element device 300 that includes two primary network line modules and two redundant network line modules. In some implementations, the example network element device 300 may include network line modules that perform the functions of more than one network node. In the illustrated example, the example network element device 300 includes a chassis 330 and a RFID device 332 that is coupled with the chassis 330. The chassis 330 is a frame that houses one or more components of the example network element device 300. In the illustrated example, the chassis 330 has four slots. The first slot houses a PNLM-1 310. The second slot houses a RNLM-1 320. The third slot houses the PNLM-2 350. The fourth slot houses the RNLM-2 360.

The RFID device 332 is a RFID device that stores one or more network node identifiers for the network line modules in the example network element device 300. In the illustrated example, the RFID device 332 may store two network node identifiers. The RFID device 332 may also store metadata corresponding to the network node identifiers. The metadata may include slot locations in the chassis that correspond to the network node identifiers. In the illustrated example, the metadata may include data specifying that network line modules (e.g., 310 and 320) installed in the first slot location (e.g., slot 1 316) and the second slot location (e.g., slot 2 326) are to be assigned the first network node identifier. Similarly, the metadata may include data specifying that the network line modules (e.g., 350 and 360) installed in the third slot location (e.g., slot 3 356) and the fourth slot location (e.g., slot 4 (366)) are to be assigned the second network node identifier.

The PNLM-1 310 can include any hardware, software, firmware, or combination thereof configured to perform the function of a network node. The PNLM-1 310 includes a RFID reader-1P 314 and a Port-1P 312. The Port-1P 312 is a communication port that provides an interface for the PNLM-1 310 to communicate with other network line modules and/or other network element devices. As described previously, in some implementations, the PNLM-1 310 may include more than one communication ports. The more than one communication ports may provide interfaces for the PNLM-1 310 to communicate with more than one network line modules and network element devices. The RFID reader-1P 314 is a RFID reader that is configured to obtain the information stored in the RFID device 332 when the PNLM-1 310 is initialized. In the illustrated example, the stored information may include two network node identifiers and metadata. Therefore, when the PNLM-1 310 is initialized, the RFID reader-1P 314 may obtain both network node identifiers and the metadata from the RFID device 332. The PNLM-1 310 may select a network node identifier based on the slot location in which the PNLM-1 310 is installed. In the illustrated example, the PNLM-1 310 is installed in slot 1 316 of the chassis 330, and the metadata indicates that the first network node identifier corresponds to slot 1 316 and slot 2 326 of the chassis 330. The PLNM-1 310 therefore may select the first network node identifier and use the first network node identifier as its network address.

The RNLM-1 320 is a redundant module for the PNLM-1 310. The RNLM-1 320 can include any hardware, software, firmware, or combination thereof configured to perform the same network node function as the PNLM-1 310. The RNLM-1 320 includes a RFID reader-1R 324 and a Port-1R 322. The Port-1R 322 is a communication port that provides an interface for the RNLM-1 320 to communicate with other network line modules and/or other network element devices. The RFID reader-1R 324 is a RFID reader that is configured to obtain the information stored in the RFID device 332 when the RNLM-1 320 is initialized.

When the RNLM-1 320 is initialized, the RFID reader-1R 324 may obtain both network node identifiers and the metadata from the RFID device 332. In the illustrated example, the RNLM-1 320 is installed in slot 2 326 of the chassis 330, and the metadata indicates that the first network node identifier corresponds to the slot 1 316 and slot 2 326 of the chassis 330. Therefore, the RNLM-1 320 may select the first network node identifier and use the first network node identifier as its network address.

The PNLM-2 350 includes a RFID reader-2P 354 and a Port-2P 352. The PNLM-2 350, the RFID reader-2P 354, and the Port-2P 352 are respectively similar to the PNLM-1 310, the RFID reader-1P 314, and the Port-2P 312 described above. When the PNLM-2 350 is initialized, the RFID reader-2P 354 may obtain both network node identifiers and the metadata from the RFID device 332. The PNLM-2 350 may select a network node identifier based on the slot location that the PNLM-2 350 is installed. In the illustrated example, the PNLM-1 310 is installed in slot 3 356 of the chassis 330, and the metadata indicates that the second network node identifier corresponds to slot 3 356 and slot 4 366 of the chassis 330. The PNLM-2 350 therefore may select the second network node identifier and use the second network node identifier as its network address The RNLM-2 360 includes a RFID reader-2R 364 and a Port-2R 362. The RNLM-2 360, the RFID reader-2R 364, and the Port-2R 362 are respectively similar to the RNLM-1 320, the RFID reader-1R 324, and the Port-2R 322 described above. When the RNLM-2 360 is initialized, the RFID reader-2R 364 may obtain both network node identifiers and the metadata from the RFID device 332. In the illustrated example, the RNLM-2 360 is installed in slot 4 366 of the chassis 330, and the metadata indicates that the second network node identifier corresponds to slot 3 356 and slot 4 366 of the chassis 330. The RNLM-2 360 therefore may select the second network node identifier and use the second network node identifier as its network address.

Figure 4:
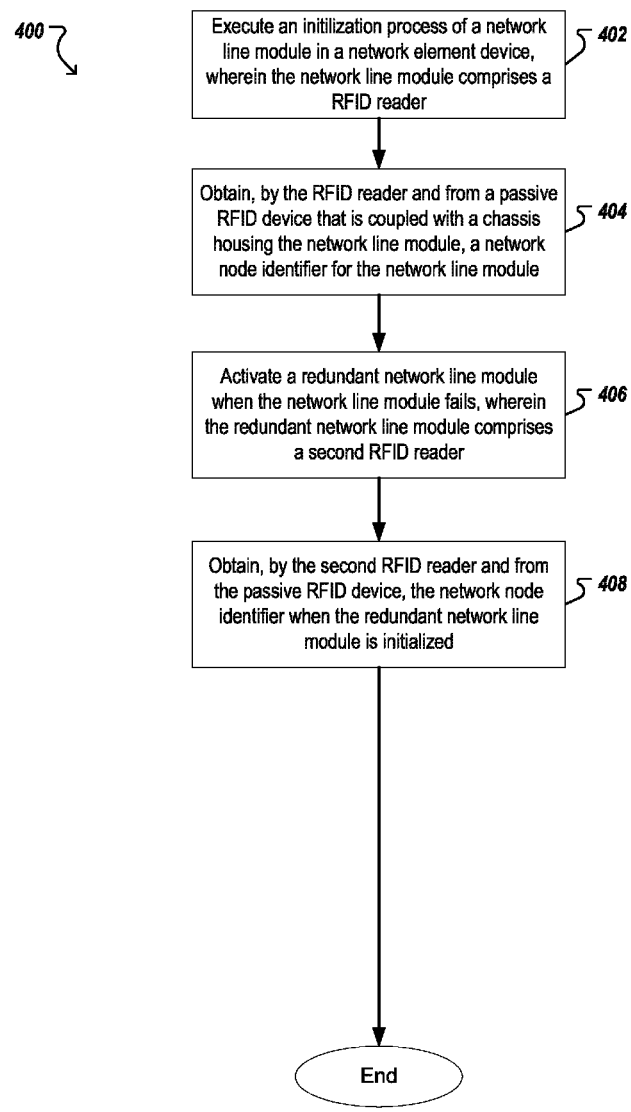
FIG. 4 is a flowchart of an example process for providing network addresses.

FIG. 4 is a flowchart of an example process 400 for providing network addresses. The example process 400 can be performed, for example, by one or more devices such as those described with reference to FIGS. 1-3. The example process 400 can also be implemented as instructions stored on a non-transitory computer readable medium that, when executed by one or more devices, configure the one or more devices to perform and/or cause the one or more devices to perform the operations of the example process 400.

The example process begins at 402, when an initialization process of a network line module in a network element device is executed. In some implementations, the initialization process may be executed when the network line module is powered up after the network line module is installed. Alternatively or additionally, the initiation process may be executed when the network line module is reset or rebooted. As discussed above with reference to FIGS. 1-3, the network line module may include a RFID reader.

At 404, the RFID reader obtains a network node identifier for the network line module from a RFID device. The RFID device is coupled with a chassis that houses the network line module. As discussed above with reference to FIG. 2, in some implementations, the RFID device may be a passive RFID device. The network node identifier may be used as a network address for the network line module to communicate with a second network element device communicatively coupled with the network element device. In some implementations, the network node identifier may be a MAC address. The RFID reader may also obtain system inventory information stored in the RFID device. The system inventory information may include at least one of a chassis serial number, a manufacture date, or a Common Language Equipment Identification (CLEI) code.

In some implementations, the RFID device may also store a second network node identifier and metadata. As discussed above with reference to FIG. 3, the network line module may select one of the network node identifier or the second network node identifier based on the metadata. In some implementations, the metadata may include a slot location in the chassis that corresponds to the network node identifier. The network line module may select the network node identifier in response to the network line module being installed in the slot location.

At 406, a redundant network line module is activated when the network line module fails. The redundant network line module may include a second RFID reader. In some implementations, the activation of the redundant line module is performed independent of a failure of the network line module. For example, the network line module may be taken offline for routine maintenance (or for other reasons), and when the network line module is taken offline, the redundant network line module can be activated.

At 408, the second RFID reader obtains the network node identifier from the RFID device. The redundant network line module may use the network node identifier to communicate with a second network element device communicatively coupled with the network element device. The second RFID reader may obtain the network node identifier when the redundant network line module is initialized. As discussed above with reference to FIG. 1 and FIG. 2, the redundant network line module may be initialized when the redundant network line module is powered up, activated, reset, or rebooted.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination or in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A network element device in a telecommunication network, comprising:
   a chassis that includes one or more slots that receive one or more network line modules;
   a passive Radio Frequency Identification (RFID) device that stores a network node identifier and is coupled to the chassis, wherein the network node identifier is used to communicate with a second network element device communicatively coupled with the network element device; and
   a network line module installed in one of the slots of the chassis, wherein the network line module comprises a RFID reader that is configured to obtain the network node identifier from the passive RFID device when the network line module is initialized.

2. The network element device of claim 1, wherein the network node identifier is a Medium Access Control address.

3. The network element device of claim 1, wherein the passive RFID device is configured to store system inventory information including at least one of a chassis serial number, a manufacture date, or a Common Language Equipment Identification (CLEI) code.

4. The network element device of claim 1, further comprising a redundant network line module configured to be activated when the network line module is offline, wherein the redundant network line module comprises a second RFID reader that is configured to obtain the network node identifier from the passive RFID device when the redundant network line module is initialized.

5. The network element device of claim 1, wherein the passive RFID device is configured to store a second network node identifier and metadata, and wherein the network line module is configured to select one of the network node identifier or the second network node identifier based on the metadata.

6. The network element device of claim 5, wherein the metadata includes a slot location in the chassis that corresponds to the network node identifier, and wherein the network line module is configured to select the network node identifier in response to the network line module being installed in the slot location.

7. The network element device of claim 1, wherein the network line module is initialized after the network line module is powered up.

8. A method, comprising:
   executing an initialization process for a network line module in a network element device, wherein the network line module comprises a RFID reader; and
   obtaining, by the RFID reader and from a passive RFID device that is coupled with a chassis housing the network line module, a network node identifier that is used by the network line module to communicate with a second network element device communicatively coupled with the network element device.

9. The method of claim 8, wherein the network node identifier is a MAC address.

10. The method of claim 8, wherein the passive RFID device is configured to store system inventory information including at least one of a chassis serial number, a manufacture date, or a Common Language Equipment Identification (CLEI) code.

11. The method of claim 8, further comprising:
    activating a redundant network line module when the network line module fails, wherein the redundant network line module comprises a second RFID reader; and
    obtaining, by the second RFID reader and from the passive RFID device, the network node identifier when the redundant network line module is initialized.

12. The method of claim 8, wherein the passive RFID device is configured to store a second network node identifier and metadata, and further comprising:
    selecting, by the network line module, one of the network node identifier or the second network node identifier based on the metadata.

13. The method of claim 12, wherein the metadata includes a slot location in the chassis that corresponds to the network node identifier, and wherein the selecting comprises selecting the network node identifier in response to the network line module being installed in the slot location.

14. The network element device of claim 8, wherein the initialization process is executed after the network line module is powered up.

* * * * *